United States Patent
Chu et al.

(10) Patent No.: US 7,934,086 B2
(45) Date of Patent: *Apr. 26, 2011

(54) MULTI-TIERED BOOT LIST

(75) Inventors: Simon C. Chu, Chapel Hill, NC (US);
Richard A. Dayan, Raleigh, NC (US);
Eric R. Kern, Chapel Hill, NC (US);
William J. Piazza, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 433 days.

This patent is subject to a terminal disclaimer.

(21) Appl. No.: 11/947,819

(22) Filed: Nov. 30, 2007

(65) Prior Publication Data

US 2009/0031014 A1    Jan. 29, 2009

Related U.S. Application Data

(63) Continuation of application No. 11/053,965, filed on Feb. 9, 2005, now Pat. No. 7,330,965.

(51) Int. Cl.
*G06F 9/00* (2006.01)
*G06F 15/177* (2006.01)
(52) U.S. Cl. .............................................. 713/2; 713/1
(58) Field of Classification Search .................... 713/1, 2
See application file for complete search history.

(56) References Cited

U.S. PATENT DOCUMENTS

| | | | |
|---|---|---|---|
| 5,677,952 A | 10/1997 | Blakley et al. | |
| 6,968,414 B2 | 11/2005 | Abbondanzio et al. | |
| 7,045,717 B2 | 5/2006 | Kolvick et al. | |
| 7,111,202 B2* | 9/2006 | Cagle et al. | 714/36 |
| 7,181,604 B2* | 2/2007 | King et al. | 713/1 |
| 7,330,965 B2* | 2/2008 | Chu et al. | 713/1 |
| 7,673,132 B2* | 3/2010 | Chu et al. | 713/2 |
| 2002/0016909 A1* | 2/2002 | Miyajima | 713/2 |
| 2003/0048614 A1 | 3/2003 | Garnett | |
| 2003/0097487 A1 | 5/2003 | Rietze et al. | |
| 2003/0105904 A1 | 6/2003 | Abbondanzio et al. | |
| 2003/0210522 A1 | 11/2003 | Rietze et al. | |
| 2004/0162977 A1* | 8/2004 | King et al. | 713/2 |
| 2004/0215952 A1 | 10/2004 | Oguma | |
| 2005/0097360 A1* | 5/2005 | Chu et al. | 713/201 |
| 2005/0114474 A1 | 5/2005 | Anderson et al. | |

* cited by examiner

*Primary Examiner* — Thomas Lee
*Assistant Examiner* — Jaweed A Abbaszadeh
(74) *Attorney, Agent, or Firm* — H. Barrett Spraggins; Cynthia G. Seal; Biggers & Ohanian, LLP

(57) ABSTRACT

An aggregated server blade system includes a plurality of individual server blades and a management module which can be designated as a bootable device. A boot list maintained and executed in each server blade includes a management module entry in its list of bootable devices. In response to the management module entry being selected or otherwise made active as the bootable device for a particular blade, an alternative bootable-devices list maintained on the management module is referenced and the boot process proceeds according to the alternative list.

11 Claims, 10 Drawing Sheets

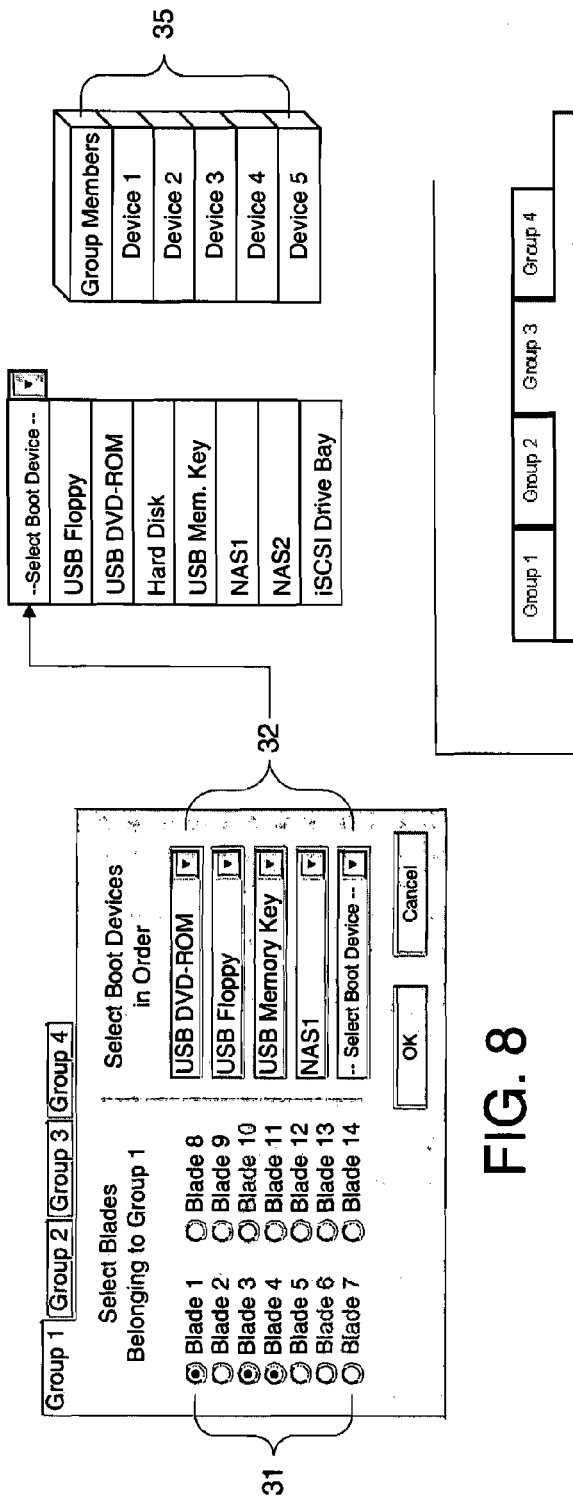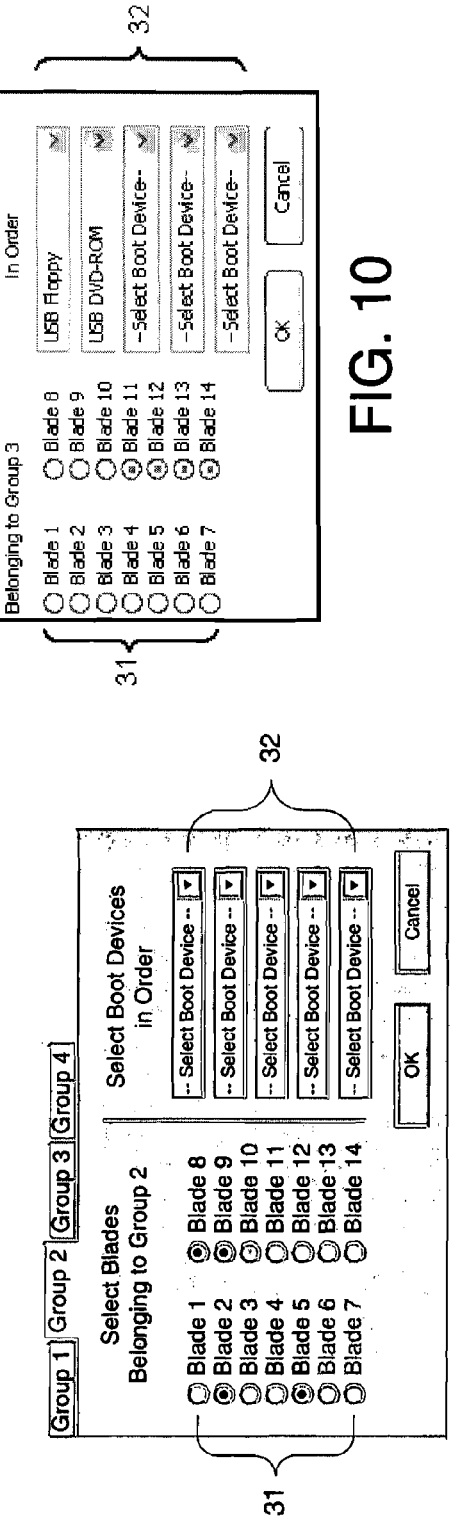
FIG. 8
FIG. 9
FIG. 10

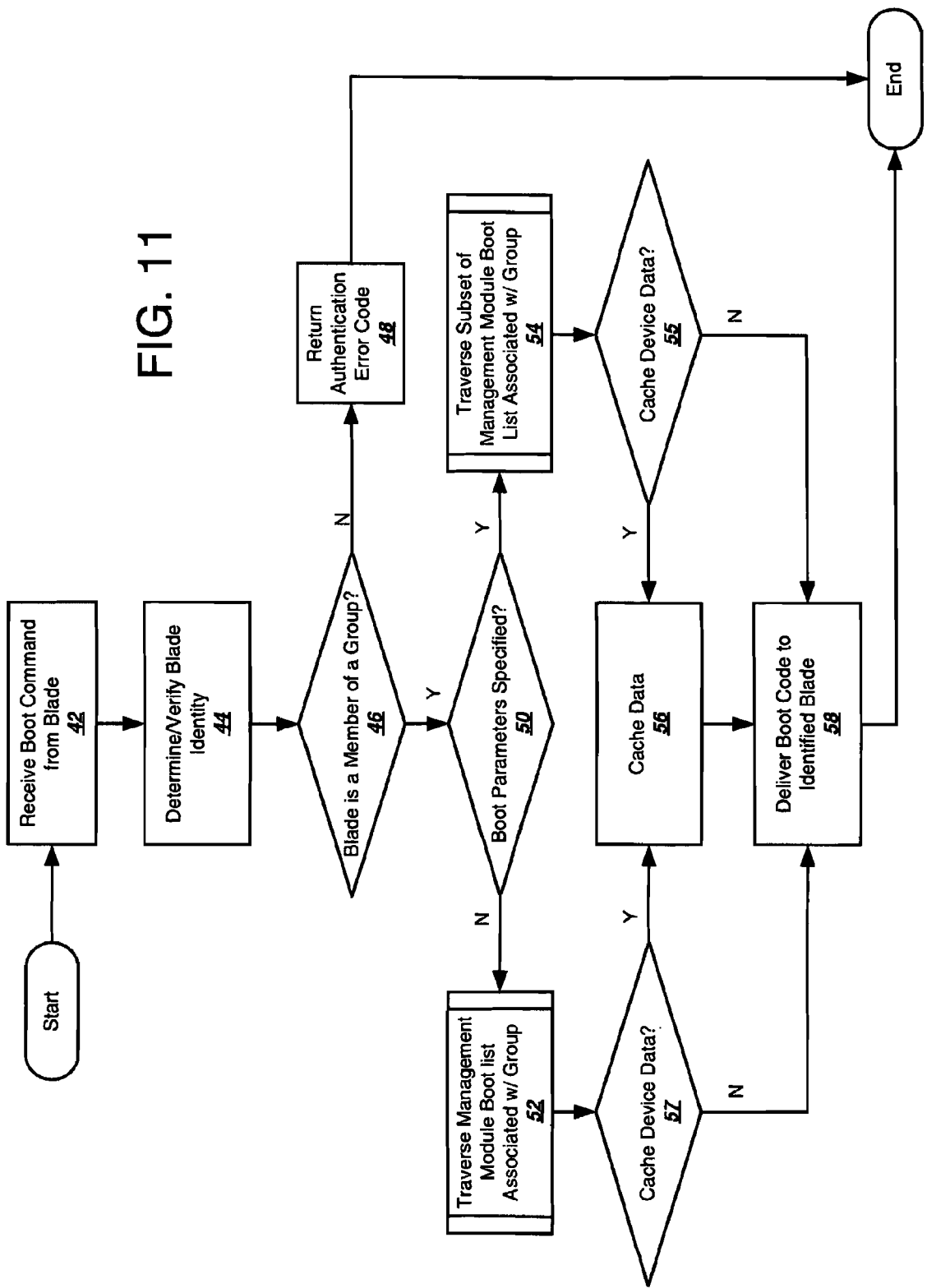

MULTI-TIERED BOOT LIST

CROSS-REFERENCE TO RELATED APPLICATION

This application is a continuation application of and claims priority from U.S. patent application Ser. No. 11/053,965, filed on Feb. 9, 2005.

The present invention is related to the subject matter of a commonly assigned, copending, U.S. patent application Ser. No. 10/977,896, entitled "Shared Simultaneously-connected Drives," and filed Oct. 29, 2004.

BACKGROUND OF THE INVENTION

This invention pertains to aggregated computing systems and other information handling systems and, more particularly, to an aggregated server blade system having a multi-tiered boot list from which boot order is established for each of a plurality of server blades in the system.

Over the last two decades, the cost of computing hardware has continued to drop. During the same period, the price of maintenance and operations has increased. Today many computing devices are frequently purchased, deployed and managed in a scattered, ad-hoc manner. The cost to maintain such hardware is staggering. Industry analyst firm Meta Group estimates that maintenance and operations for a company's end-user environment can account for 80% of IT costs. For example, the average desktop PC maintenance costs a business between $2,000 and $5,000 per PC, per year, per person.

Aggregated server blade systems go a long way toward addressing the maintenance and operational costs associated with hardware. Yet, traditional aggregated server blade systems can be difficult to maintain and can be quite inflexible when it comes to selecting boot devices for each of the blades in the system. At present, when it is desired to change the boot order for devices which are accessible to each blade, an administrator must login to each blade server and reconfigure the boot list for each blade. This can be a time-consuming and frustrating task for any administrator and drives up the cost of maintenance for an aggregated server blade system.

Security aspects of aggregated server systems remain a vital concern. Applicants have recognized, at the onset, that any proposed system which intends to simplify the administrative tasks surrounding boot lists in such server systems must do so without introducing security leaks.

Traditional aggregated server blade systems share access to a single USB DVD ROM drive. In the traditional arrangement, the DVD ROM drive can only be accessed by one blade at a time. Accordingly, booting from the DVD ROM drive is restricted to a serialized one-blade-at-a-time process where more than one blade requires access to the DVD ROM drive. In any scenario which results in the well-known boot storm problem where all blades in an aggregated server blade system are directed to simultaneously boot from the single DVD ROM drive, since the boot process is serialized from blade to blade, some of the server blades will experience an inordinate amount of time before being able to boot.

For example, today, the UpdateXpress CD performs updates one blade at a time. It currently takes three hours, on average, to complete one BIOS update for 14 blades. Where a critical update is required in order to continue processing at all of the server blades, such as when a network-spreadable virus has been detected, this three-hour delay manifests into a three-hour downtime period. Clearly, such downtime would not be permissible in critical computing applications such as Web hosting.

SUMMARY OF THE INVENTION

What is needed, therefore, are methods, apparatus, and program products which more flexibly allow an administrator to manage boot lists, which impart a level of security to a boot list system, and which solve the boot serialization problems caused by multiple devices simultaneously accessing a single boot device.

As will be seen, the embodiments disclosed satisfy the foregoing needs and accomplish additional purposes. With the capability provided by the present invention, updating the 14 blades in the UpdateXpress CD example above requires less than 14 minutes to complete. Meanwhile, system security is improved and the process of updating and maintaining boot lists is greatly enhanced.

It has been discovered that the above described challenges are addressed by configuring a first computing device to include a predetermined entry in a first boot list which is maintained on a first computing device. The first boot list specifies devices which are available for booting purposes by the first computing device. The first computing device traverses the first boot list and attempts to retrieve bootable code from each of the devices in the first boot list for execution on the first computing device. On a second computing device, a second boot list is maintained for specifying bootable devices from which bootable code can also be retrieved for execution. In response to the first computing device traversing the first boot list and encountering the predetermined entry, the first computing device issues a command to the second computing device. In response to the issued command, the second boot list is traversed in search of boot code which is ultimately executed on the first computing device. As will be seen, the traversal of the second list can occur at the first computing device or at the second computing device.

In a preferred embodiment, the relationship between the first computing device and the second computing device is that of blade to management module (or optionally, vice versa) in an aggregated server blade system. Preferably, as will be seen, a level of security is conferred through the use of authentication and/or verification relating to the second boot list.

According to one embodiment, the second computing device traverses the second boot list in response to the issued command and, in response to encountering accessible boot code at a device on the second list, the second computing device routes the boot code to the first computing device. In this or in other embodiments, the boot code can be cached for efficiency and delivered directly from the cache to all requesting computing devices to improve throughput. One example of where caching is beneficial is in the case where the boot code is to be distributed to more than one computing device.

In one embodiment, the second computing device returns the second boot list to the first computing device in response to the command. In this embodiment, the first computing device traverses the returned second boot list in search of the boot code depending on whether the boot code is either directly or indirectly accessible.

If a listed device is directly accessible by the first computing device, the first computing device attempts to retrieve the boot code from the directly accessible device. If boot code is encountered, the first computing device executes the boot code.

If a listed device is indirectly accessible, the first computing device issues a second command identifying the indirectly accessible device to the second computing device. In response to the second command, the second computing device attempts to retrieve the boot code from the indirectly accessible device. If encountered, the second computing device routes the boot code to the first computing device for execution thereon.

The devices listed on the second boot list can be the same devices specified in the first boot list or can be different devices. The first and second boot lists can be maintained by either the same or different system administrators.

Aspects of the invention include methods which perform the processes described herein, apparatus which provide the platform for and are programmed to execute the processes, and computer program products comprising a computer readable medium having computer readable instructions stored thereon for executing the processes.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Some of the purposes of the invention having been stated, others will appear as the description proceeds, when taken in connection with the accompanying drawings, in which:

FIG. 8 depicts a selection tab within a management module configured according to an embodiment of the present invention which allows a user configuring a management module to assign blades to a first group and assign accessible boot devices and their order for the first group.

FIG. 9 depicts a selection tab within a management module configured according to an embodiment of the present invention which allows a user configuring a management module to assign blades to a second group and assign accessible boot devices and their order for the second group.

FIG. 10 depicts a selection tab within a management module configured according to an embodiment of the present invention which allows a user configuring a management module to assign blades to a third group and assign accessible boot devices and their order for the third group.

FIG. 11 is a logic flow diagram depicting the logic executed according to one embodiment of the present invention in response to receiving a boot command from a blade specifying the management module as the boot device.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Reference throughout this specification to Aone embodiment,@ Aan embodiment,@ or similar language means that a particular feature, structure, or characteristic described in connection with the embodiment is included in at least one embodiment of the present invention. Thus, appearances of the phrases Ain one embodiment,@ Ain an embodiment,@ and similar language throughout this specification may, but do not necessarily, all refer to the same embodiment.

Server Blade System Overview

Figure 1:
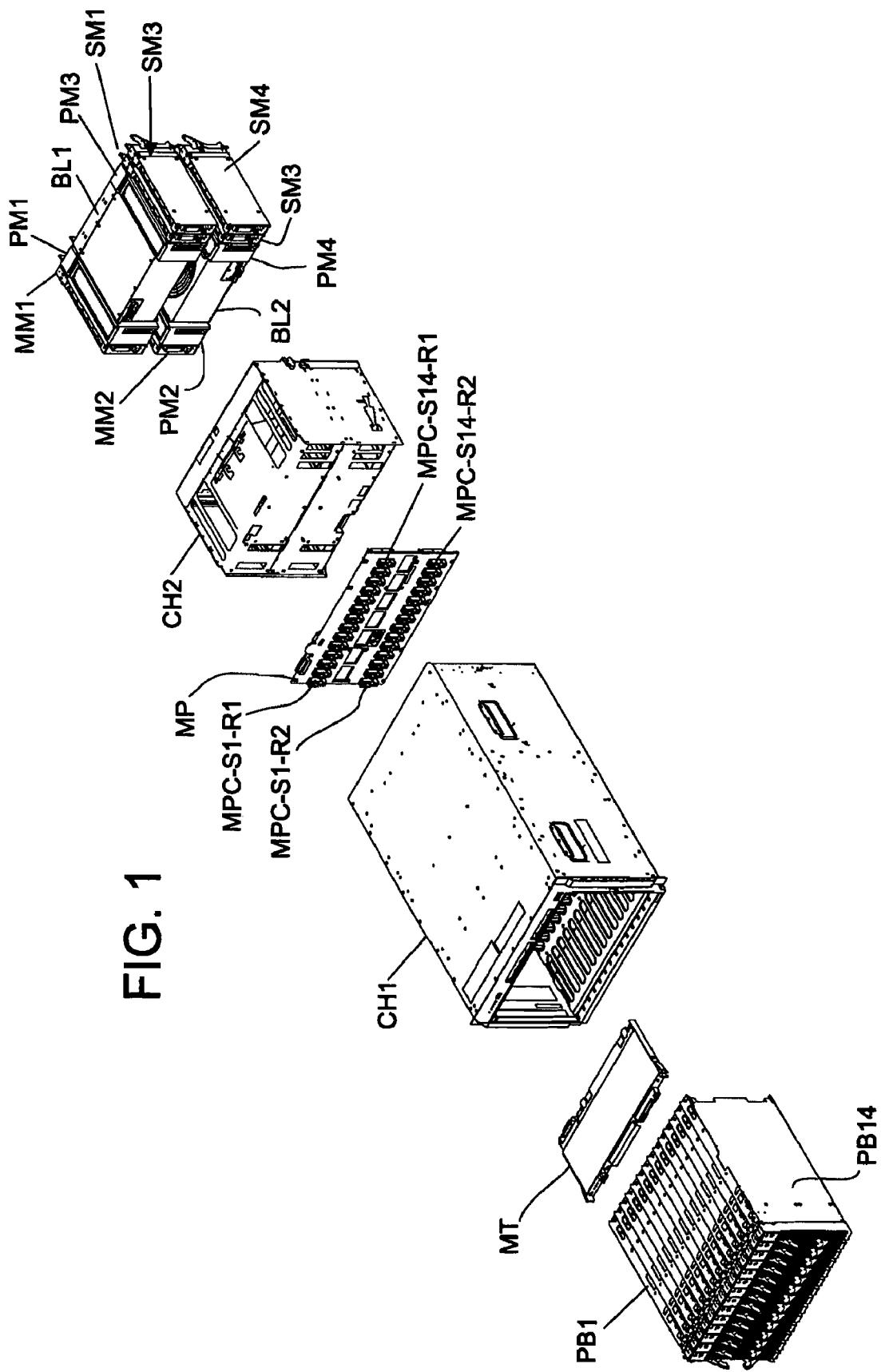
FIG. 1 is a front, top and right side exploded perspective view of a server blade system of the present invention.

Referring now more particularly to the accompanying drawings, in which like numerals indicate like elements or steps throughout the several views, FIG. 1 is a front, top and right side exploded perspective view of a server blade system. Referring to this figure, main chassis CH1 houses all the components of the server blade system. Up to 14 processor blades PB1 through PB14 (or other blades, such as storage blades) are hot pluggable into the 14 slots in the front of chassis CH1. The term Aserver blade,@ Aprocessor blade,@ or simply Ablade@ is used throughout the specification and claims, but it should be understood that these terms are not limited to blades that only perform Aprocessor@ or Aserver@ functions, but also include blades that perform other functions, such as storage blades, which typically include hard disk drives and whose primary function is data storage. Client blades are now also being used in increasing numbers.

Processor blades provide the processor, memory, hard disk storage and firmware of an industry standard server. In addition, they include keyboard, video and mouse (AKVM@) selection via a control panel, an onboard service processor, and access to the floppy and DVD-ROM drives in the media tray. A daughter card is connected via an onboard PCI-X interface and is used to provide additional high-speed links to switch modules SM3 and SM4 (described below). Each processor blade also has a front panel with 5 LED=s to indicate current status, plus four push-button switches for power on/off, selection of processor blade, reset, and non-maskable interrupt for core dumps for local control.

Blades may be >hot swapped= without affecting the operation of other blades in the system. A server blade is typically implemented as a single slot card (394.2 mm×226.99 mm); however, in some cases a single processor blade may require two slots. A processor blade can use any microprocessor technology as long as it compliant with the mechanical and electrical interfaces, and the power and cooling requirements of the server blade system.

For redundancy, processor blades have two signal and power connectors; one connected to the upper connector of the corresponding slot of midplane MP (described below), and the other connected to the corresponding lower connector of the midplane. Processor Blades interface with other components in the server blade system via the following midplane interfaces: 1) Gigabit Ethernet (2 per blade; required); 2) Fibre Channel (2 per blade; optional); 3) management module serial link; 4) VGA analog video link; 5) keyboard/mouse USB link; 6) DVD-ROM and floppy disk drive (AFDD@) USB link; 7) 12 VDC power; and 8) miscellaneous control signals. These interfaces provide the ability to communicate to other components in the server blade system such as management modules, switch modules, the DVD-ROM and the FDD. These interfaces are duplicated on the midplane to provide redundancy. A processor blade typically supports booting from the media tray DVD-ROM or FDD, the network (Fibre channel or Ethernet), or its local hard disk drive.

A media tray MT includes a floppy disk drive and a DVD-ROM or CD-ROM drive that can be logically and/or physically coupled to any one of the 14 blades. The media tray MT also houses an interface board on which is mounted interface LED=s, a thermistor for measuring inlet air temperature, and a 4-port USB controller hub. System level interface controls consist of power, location, over temperature, information, and general fault LED=s and a USB port.

Midplane circuit board MP is positioned approximately in the middle of chassis CH1 and includes two rows of connectors; the top row including connectors MPC-S1-R1 through MPC-S14-R1, and the bottom row including connectors MPC-S1-R2 through MPC-S14-R2. Thus, each one of the 14 slots includes one pair of midplane connectors located one above the other (e.g., connectors MPC-S1-R1 and MPC-S1-R2) and each pair of midplane connectors mates to a pair of connectors at the rear edge of each processor blade (not visible in FIG. 1).

Figure 2:
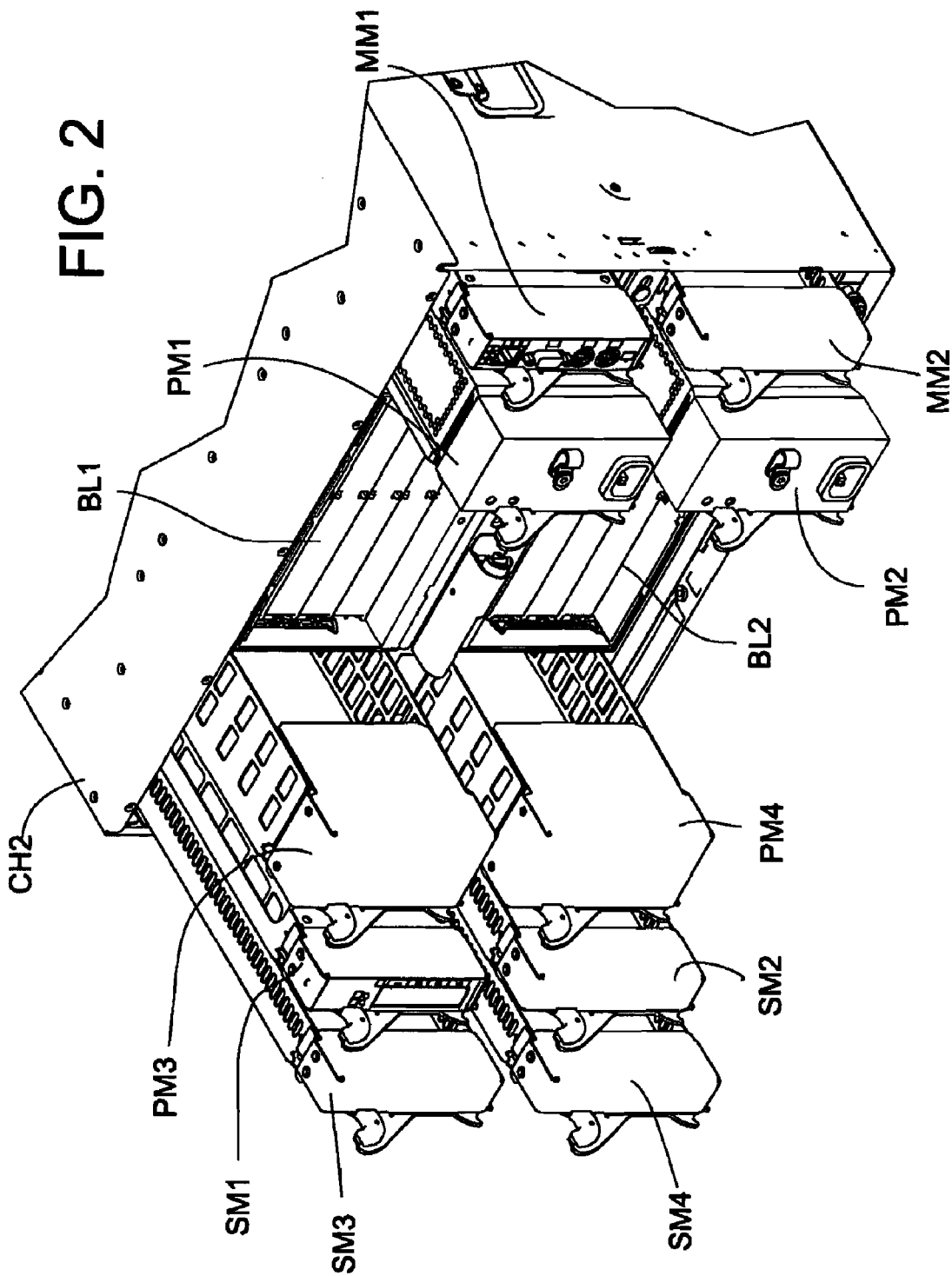
FIG. 2 is a rear, top and left side perspective view of the rear portion of the server blade system.

FIG. 2 is a rear, top and left side perspective view of the rear portion of the server blade system. Referring to FIGS. 1 and 2, a chassis CH2 houses various hot-pluggable components for cooling, power, control and switching. Chassis CH2 slides and latches into the rear of main chassis CH1.

Two hot-pluggable blowers BL1 and BL2 include backward-curved impeller blowers and provide redundant cooling to the server blade system components. Airflow is from the front to the rear of chassis CH1. Each of the processor blades PB1 through PB14 includes a front grille to admit air, and low-profile vapor chamber based heat sinks are used to cool the processors within the blades. Total airflow through the system chassis is about 300 CFM at 0.7 inches H2O static pressure drop. In the event of blower failure or removal, the speed of the remaining blower automatically increases to maintain the required air flow until the replacement unit is installed. Blower speed control is also controlled via a thermistor that constantly monitors inlet air temperature. The temperature of the server blade system components are also monitored and blower speed will increase automatically in response to rising temperature levels as reported by the various temperature sensors.

Four hot-pluggable power modules PM1 through PM4 provide DC operating voltages for the processor blades and other components. One pair of power modules provides power to all the management modules and switch modules, plus any blades that are plugged into slots 1-6. The other pair of power modules provides power to any blades in slots 7-14. Within each pair of power modules, one power module acts as a backup for the other in the event the first power module fails or is removed. Thus, a minimum of two active power modules are required to power a fully featured and configured chassis loaded with 14 processor blades, 4 switch modules, 2 blowers, and 2 management modules. However, four power modules are needed to provide full redundancy and backup capability. The power modules are designed for operation between an AC input voltage range of 200VAC to 240VAC at 50/60 Hz and use an IEC320 C14 male appliance coupler. The power modules provide +12VDC output to the midplane from which all server blade system components get their power. Two +12VDC midplane power buses are used for redundancy and active current sharing of the output load between redundant power modules is performed.

Management modules MM1 through MM2 are hot-pluggable components that provide basic management functions such as controlling, monitoring, alerting, restarting and diagnostics. Management modules also provide other functions required to manage shared resources, such as the ability to switch the common keyboard, video, and mouse signals among processor blades. The term Amanagement module@ is used throughout the specification and claims, but it should be understood that this term is not limited to chassis mountable modules that only perform management functions, but also include computer like modules that perform other functions, such as sideband signaling, boot list provision, and boot device access. A management module is a network accessible computer in its own right. It includes its own PowerPC processor and is typically accessed by a client over a network. An administrator accesses the management module either remotely or locally and is able to program or configure the blades or other aspects of the Server Blade System according to his or her liking.

Figure 3:
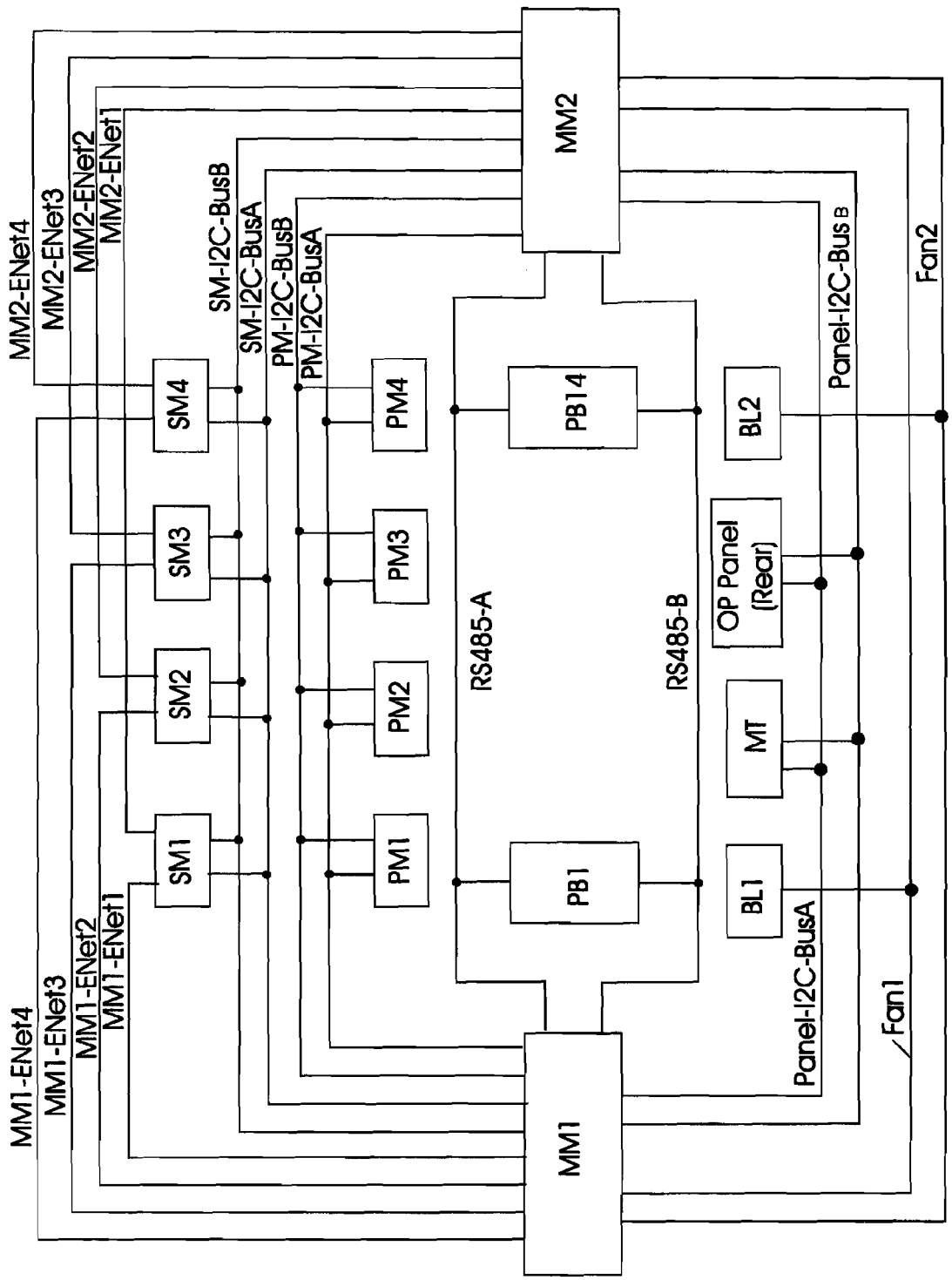
FIG. 3 is a schematic diagram of the server blade system=s management subsystem.

FIG. 3 is a schematic diagram of the server blade system=s management subsystem. Referring to this figure, each management module has a separate Ethernet link to each one of the switch modules SM1 through SM4. Thus, management module MM1 is linked to switch modules SM1 through SM4 via Ethernet links MM1-ENet1 through MM1-ENet4, and management module MM2 is linked to the switch modules via Ethernet links MM2-ENet1 through MM2-ENet4. In addition, the management modules are also coupled to the switch modules via two well known serial I2C buses SM-I2C-BusA and SM-I2C-BusB, which provide for Aout-of-band@ communication between the management modules and the switch modules. Similarly, the management modules are also coupled to the power modules PM1 through PM4 via two serial I2C buses PM-I2C-BusA and PM-I2C-BusB. Two more I2C buses Panel-I2C-BusA and Panel-I2C-BusB are coupled to media tray MT and the rear panel. Blowers BL1 and BL2 are controlled over separate serial buses Fan1 and Fan2. Two well known RS485 serial buses RS485-A and RS485-B are coupled to server blades PB1 through PB14 for Aout-of-band@ communication between the management modules and the server blades.

Figure 4:
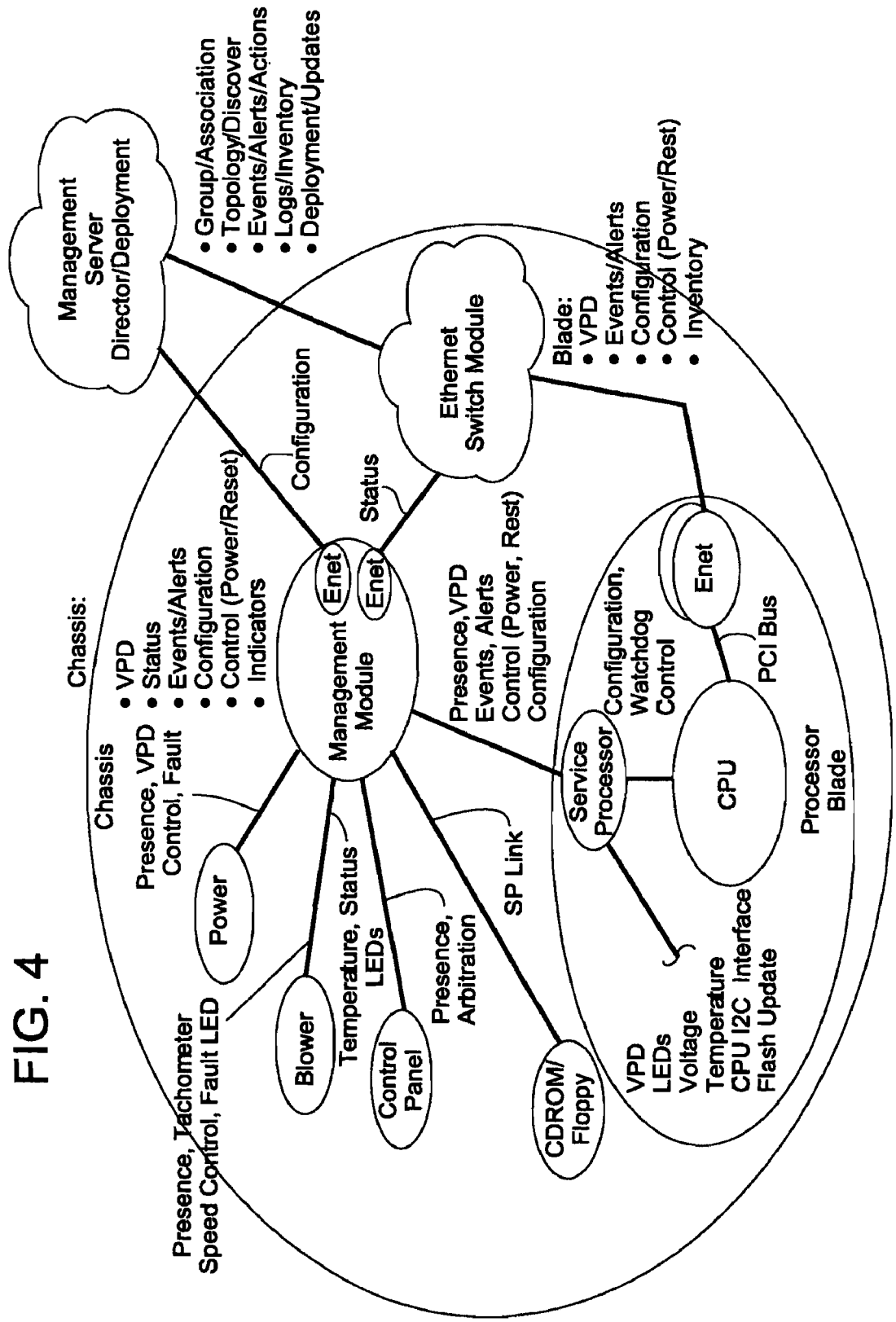
FIG. 4 is a topographical illustration of the server blade system=s management functions.

FIG. 4 is a topographical illustration of the server blade system=s management functions. Referring to FIGS. 3 and 4, each of the two management modules has a 100 Mbps Ethernet port that is intended to be attached to a private, secure management server. The management module firmware supports a web browser interface for either direct or remote access. Each processor blade has a dedicated service processor (SP) for sending and receiving commands to and from the management modules. The data ports that are associated with the switch modules can be used to access the processor blades for image deployment and application management, but are not intended to provide chassis management services. A management and control protocol allows the management module to authenticate individual blades as part of the blade activation procedure. A management module can also send alerts to a remote console to indicate changes in status, such as removal or addition of a blade or module. A management module also provides access to the internal management ports of the switch modules and to other major chassis subsystems (power, cooling, control panel, and media drives).

The management module communicates with each processor blade service processor via the out-of-band serial bus, with one management module acting as the master and the processor blade=s service processor acting as a slave. For redundancy, there are two serial busses (one bus per midplane connector) to communicate with each processor blade=s service processor. The processor bade is responsible for activating the correct interface to the top or bottom midplane connector based upon the state of the signals from the active management module. When two management modules are installed, the module in slot 1 will normally assume the active management role, while the module in slot 2 will be reserved as a standby module. In event of management module failure or removal after the chassis subsystems have been initialized, the operation of the processor blades and switch subsystems are not affected. Thus, if both management modules are inactive or removed, the server blade system=s components will continue to function, but chassis configuration cannot be changed. Addresses are hardwired for each slot on each top and bottom midplane connector, and used by a processor blade=s service processor to determine which processor blade is being addressed on the serial bus.

Each of the four switch modules SM1 through SM4 has a dedicated 100 Mbps Ethernet link to the two management modules MM1 and MM2. This provides a secure high-speed communication path to each of the switch modules for control and management purposes only. The I2C serial links are used by the management module to internally provide control of the switch module and to collect system status and vendor product data (AVPD@) information. To accomplish this, the various control and data areas within the switch modules, such as status and diagnostic registers and VPD information, are accessible by the management module firmware. In general, the active management module can detect the presence, quantity, type, and revision level of each blade, power module, blower, and midplane in the system, and can detect invalid or unsupported configurations (e.g., processor blades with Fibre Channel daughter cards connected to Ethernet switch modules.) This function relies upon VPD information within each subsystem as well as signals from the various hardware interfaces or communication via the service processor protocols.

Figure 5:
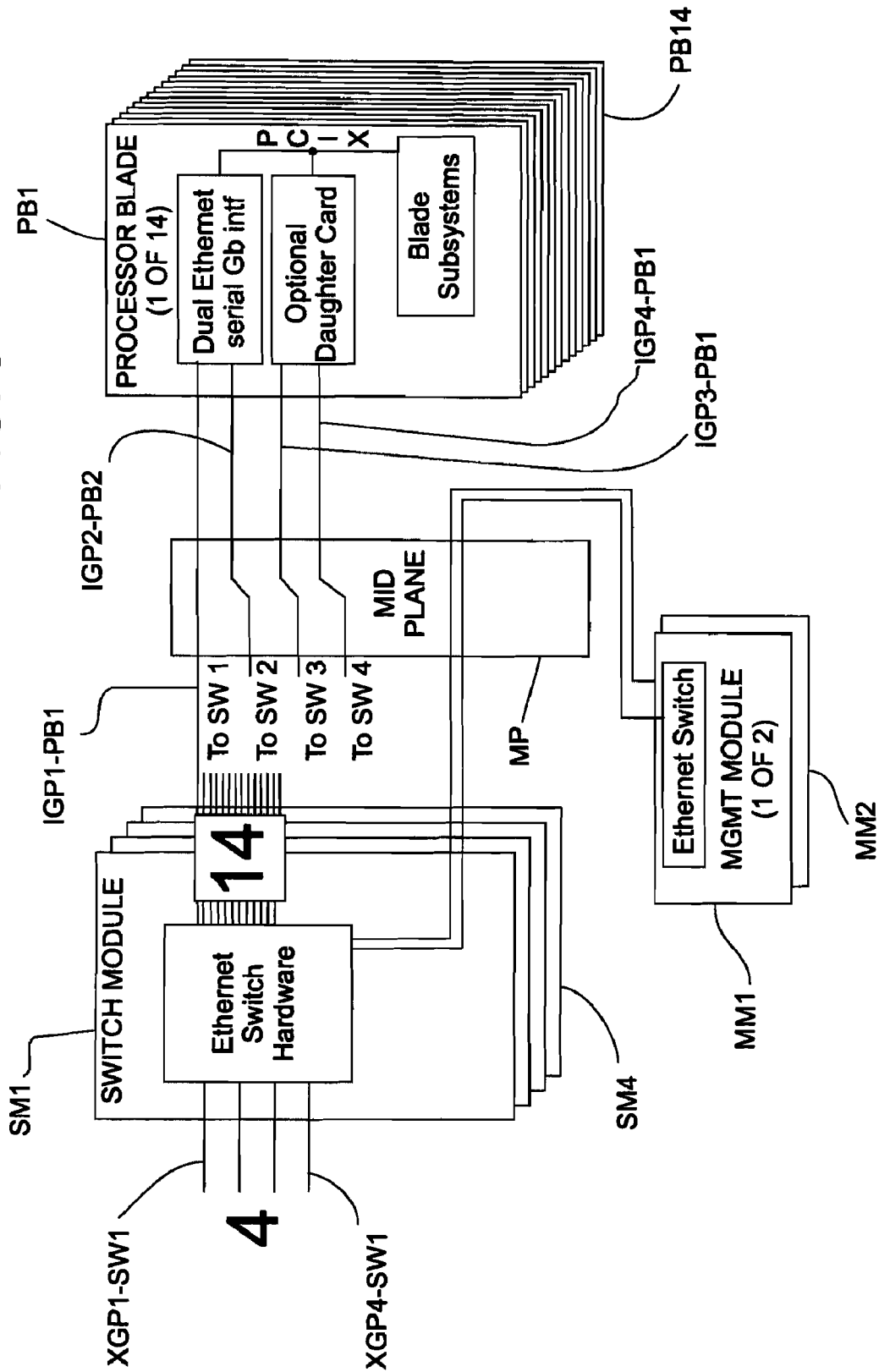
FIG. 5 is a block diagram of the switch module and processor blade interconnection.

FIG. 5 is a block diagram of the switch module and processor blade interconnection. Chassis CH2 houses accepts up to four switch modules SM1 through SM4, SM1 is preferably ethernet based and up to two of the four switch modules can optionally be Fibre Channel based. A Fibre Channel based example will be described below. Referring to this figure, an embodiment is shown having four ethernet based switch modules, each switch module SM1 through SM4 includes four external gigabit ports. For example, switch module SM1 includes external gigabit ports XGP1-SW1 through XGP4-SW1. Each processor blade includes four internal gigabit ports coupling the processor blade to each one of the four switch modules through the midplane connectors. For example, processor blade PB1 includes four internal gigabit ports IGP1-PB1 through IGP4-PB1. In addition, each management module is coupled to the switch module via an Ethernet link.

The Ethernet Switch Modules are hot-pluggable components that provide Ethernet switching capabilities to the server blade system. The primary purpose of the switch module is to provide Ethernet interconnectivity between the processor blades, management modules and the outside network infrastructure. Depending on the application, the external Ethernet interfaces may be configured to meet a variety of requirements for bandwidth and function. One Ethernet switch module is included in the base system configuration, while a second Ethernet switch module is recommended for redundancy. Each processor blade has a dedicated, 1000 Mbps (1 Gbps) full-duplex SERDES link to each of the two switch modules, and each switch module has four external 1 Gbps (RJ45) ports for connection to the external network infrastructure.

Ethernet switch modules SM3 and SM4 of FIG. 5 can be replaced with Fibre Channel based modules. Fibre Channel (FC) is an industry standard networking scheme for sharing remote storage devices among a group of servers. Each processor blade includes a connector to accept a Fibre Channel daughter board containing two Fibre Channel ports of 2 Gb each for connection to dual Fibre Channel switch modules. The routing of the Fibre Channel signals occurs through the midplane to the Fibre Channel switch modules in slots 3 and 4 in the rear of the server blade chassis. Each Fibre Channel switch module is hot-pluggable without disruption of blade or chassis operation. The routing of the two Fibre Channel ports is such that one port from each processor blade is wired to one Fibre Channel switch module, and the other port is wired to the other Fibre Channel switch module to provide redundancy. Each Fibre Channel switch module has 2 external 2 Gb ports for attachment to the external Fibre Channel switch and storage infrastructure. This option allows each of the 14 processor blades to have simultaneous access to a Fibre Channel based storage area network (SAN) as well as the Ethernet based communications network.

Figure 6:
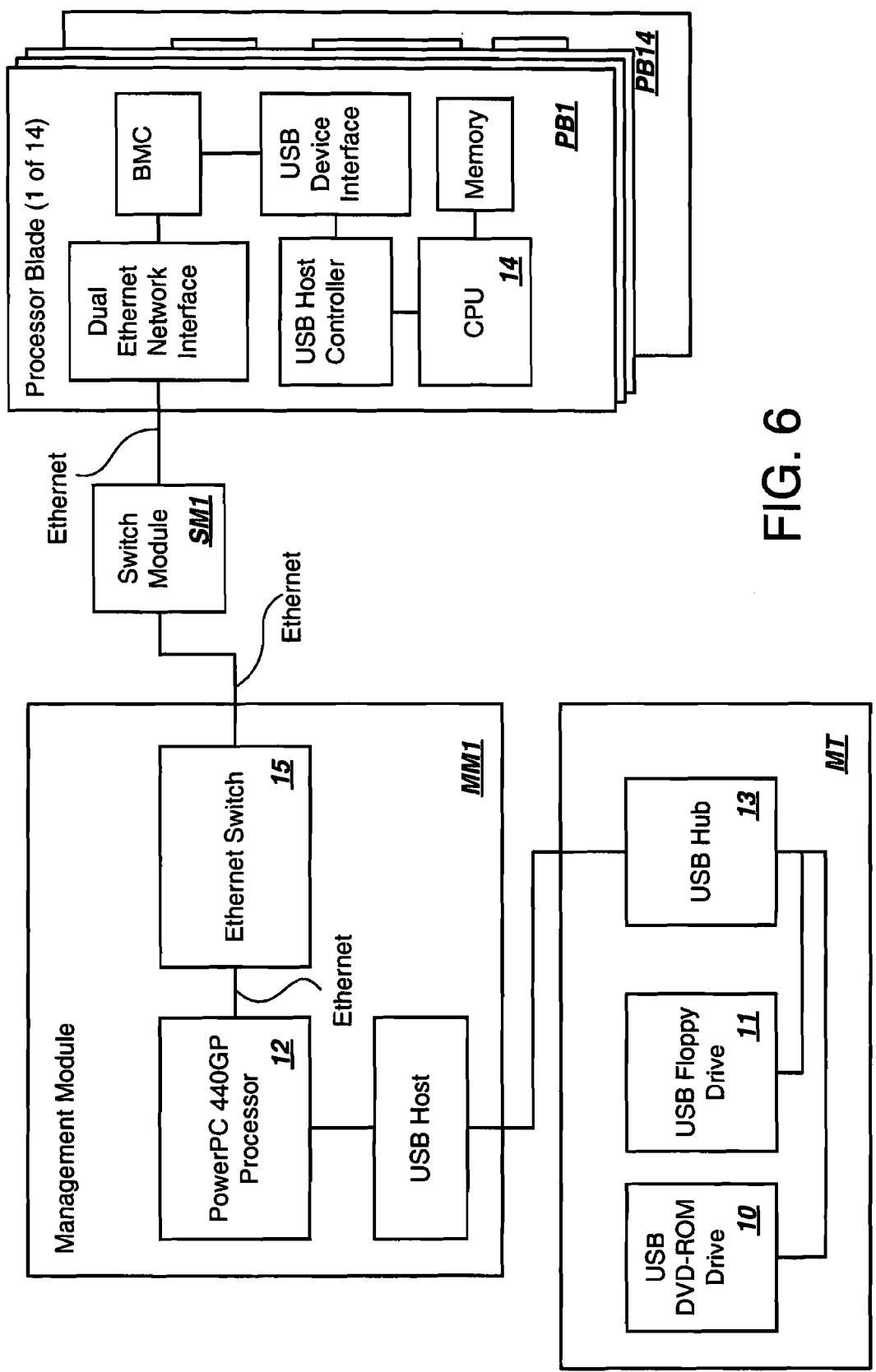
FIG. 6 is a block diagram depicting a multiple server blade system configured according to an embodiment of the present invention.

FIG. 6 is a block diagram depicting a multiple server blade system configured according to an embodiment of the present invention. Referring to this figure, each of the 14 processor blades PB1 through PB14 are simultaneously given access to bootable devices mounted on or accessible through the media tray or through ethernet switch 15 of management module MM1. Bootable devices coupled through media tray MT include USB DVD-ROM drive 10, USB floppy drive 11, and other devices which are attachable to USB hub 13 such as a thumb drive or a memory key fob. Access to these and other bootable devices are made to appear simultaneously available to the processor blades PB1 through PB14 via ethernet connection through switch module SM1 and management module MM1. Processor 12 of management module MM1 provides the drive emulation required to make the bootable devices appear simultaneously available to all blades. In addition to bootable devices coupled through media tray MT, other bootable devices are accessible through switch module at SM1 and/or management module MM1, such as network attached storage including iSCSI or Fibre Channel over IP attached storage bays or storage networks.

Further construction and operational details related to the arrangement shown in FIG. 6, for simultaneously sharing removable media drives and the like, are provided in commonly assigned and co-pending U.S. patent application Ser. No. 10/977,896 entitled "Shared Simultaneously-connected Drives." This application is incorporated herein by reference in its entirety.

The arrangement shown in FIG. 6, however, is exemplary of one embodiment and is not required to practice the invention. As an alternative to the shared simultaneously-connected drive embodiment shown in FIG. 6, one embodiment is contemplated in which drive access is physically exclusive. In either this embodiment or the depicted embodiment, the contents of each of the bootable devices, i.e., the boot code, can be cached at management module MM1 as shall be described for the depicted embodiment. If cached, the boot code is forwarded by management module MM1, as needed, to any of the blades during their boot process.

Boot List Implementation

Figure 7:
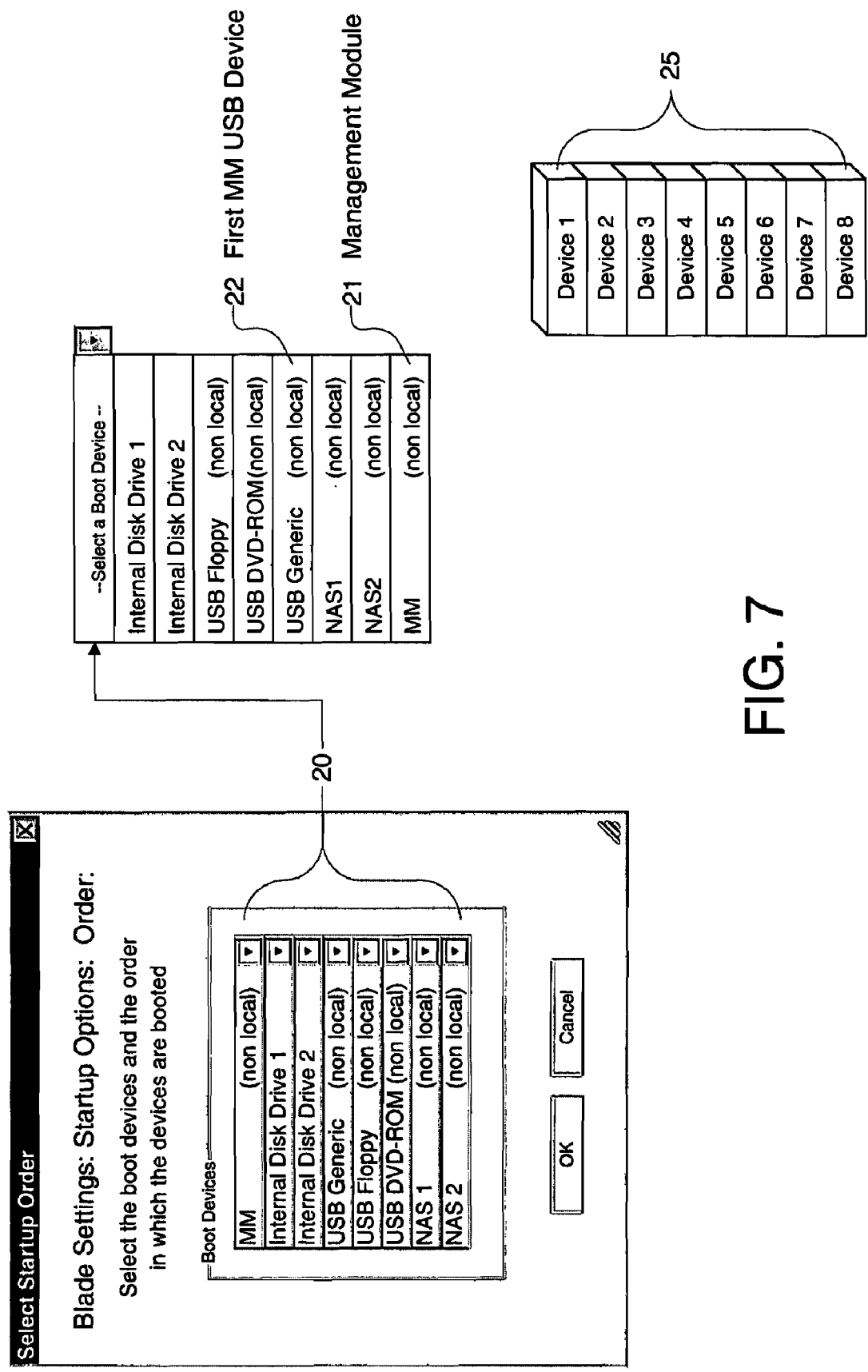
FIG. 7 depicts a selection menu within a server blade configured according to an embodiment of the present invention which allows a user configuring a server blade to select blade accessible boot devices and their boot order.

FIG. 7 depicts a selection menu within a server blade configured according to an embodiment of the present invention which allows a user configuring a server blade to select blade accessible boot devices and their boot order. Referring now to this figure, the user, typically an administrator, is presented with eight pull-down choice boxes 20. For each choice box 20, a pull-down menu (an exploded view is shown on the right) is invoked by clicking anywhere within each box area. The pull-down menu allows the user to select any of a series of boot devices from which to boot the blade. In operation, an underlying data structure 25 is maintained in memory and reflects the choices made in the selection menu. This underlying data structure is referred to as the Ablade boot list@ 25. Preferably, each individual blade has its own boot list. The devices available for selection include devices housed within the server blade, such as internal disk drives; and non-local devices, including network attached storage (NAS), USB floppy and DVD-ROM drives which are housed within media tray MT and accessible through management module MM1; and two Adevice@ designators which act as pointers: USB generic 22, and MM 21. The latter being a direct pointer to the management module MM1 itself.

At boot time, the blade selects boot devices by traversing the blade boot list 25 and attempts to boot from each of the devices listed. In this embodiment, device selection is made by traversing the list in FIFO order according to the order specified by each of the eight pull-down choice boxes 20. However, orders other than FIFO order can be established.

When either of the internal disk drive devices or either of the NAS devices are selected, the blade boots from these devices in the usual and well known manner.

When either the USB floppy or the USB DVD-ROM drive is selected, access is provided to these devices through management module MM1 subject to the functionality of management module MM1 which includes authentication, permissions, caching, priority, and other management module MM1 functions which are to be described.

When either of the two device pointer entries MM 21 or USB generic device 22 are selected from the blade boot list 25, the blade undergoes the processing described below.

When device MM 21 is selected, a boot command is issued to management module MM1 with either no management module parameters, a parameter that identifies management module MM1 as the boot device, or with a parameter that specifies that a second boot list maintained on management module MM1 itself is to be referred to for booting purposes. Preferably, the blade passes the parameter that identifies management module MM1 as the boot device and does not have knowledge of the second boot list maintained on management module MM1; this second boot list is herein referred to as the Amanagement module boot list. @ Alternatively, when no management module parameters are defined or specified, a default can be established that points to management module MM1 as the boot device or that points to the management module boot list. The boot command issued to management module MM1 is issued over the network via the ethernet network interface provided by the network daughter card installed on the blade.

The network daughter card installs code which is accessible to the blade and provides boot access to management module MM1. As previously described (with reference to FIG. 5), communication between any individual blade and management module MM1 occurs through the ethernet connection. When each blade boots, as part of the cold boot process (booting from a power off condition or the appropriate interrupt), a ROM scan is executed in which a hexadecimal value of 0x55AA is expected at the base address of an area in memory reserved for daughter cards. When found, ROM code residing on the blade=s ethernet daughter card is executed. This code hooks INT 0x13 in the usual manner and resides in memory as a part of the INT 0x13 chain. Once hooked, the code resident in memory imparts INT 0x13 with the capability to boot from the management module in like manner to well known procedures for booting from network accessible devices. Preferably, one or more parameters particular to this embodiment are passed along with the INT 0x13 call (the boot command) which designate management module MM1 and other parameters to be described. When called, the hooked code accesses management module MM1 by passing the boot command requesting boot code from management module MM1 and optionally passes variables which identify the blade and the type of boot desired. Although a blade identifier can be included in the boot command, management module MM1 preferably utilizes its own authentication criteria, for security purposes, for determining and/or verifying from which blade the boot request originates. This authentication of the blade=s identity is made by management module MM1 by checking channel characteristics of the logical (or optionally physical) channel through which the boot command transfers. Other authentication methods can be used. As a result of this boot command, the booting process proceeds on management module MM1 (in the depicted embodiment) as shall be described in greater detail with reference to other figures.

Continuing now with the description for when device MM 21 is selected, the blade issues the appropriate INT 0x13 boot command and enters a wait state thread for boot code which is eventually returned from the management module in response to management module MM1 boot actions which will be described in further detail and include traversing a second list, one of several management module boot lists, maintained on the management module MM1. In an alternative embodiment, rather than having management module MM1 traverse the second list and return boot code, the management module MM1 can respond to the boot command by returning the second boot list as data. In this alternative embodiment, the blade can then traverse the second boot list itself in search of boot code residing on the devices listed in the second boot list (the returned boot list). Thus, the scope of the below claims is not limited to the management module MM1 traversing the second list and directly returning boot code to the blade, unless expressly recited.

When USB generic device 22 is selected, a boot command is issued to management module MM1 with a parameter which indicates either that an unspecified USB device or a specified USB device is to be used for booting. Where the parameter indicates that an unspecified USB device is to be used for booting, management module MM1 traverses the second list and, subject to restrictions which are to be described, selects only USB devices on the second list as potential boot candidates. Where the parameter indicates that a specified USB device is to be used for booting, subject to the same restrictions, management module MM1 uses the specified USB device if listed on the appropriate second list.

FIGS. 8, 9, and 10 depict selection tabs within a management module configured according embodiments of the present invention which allow a user configuring a management module to assign blades to specific groups and assign accessible boot devices and their order for each group. Management module MM1's processor 12 executes code which provides the interfaces shown in FIGS. 8, 9, and 10 using well-known methods. Through these interfaces, a user, usually an administrator, is able to designate secondary boot lists which are generated either remotely from a client, or locally (for example, by pressing and holding a button on the face of the blade), and which apply to specific blades 31. Security is enhanced by virtue of the administrator being able to exclude certain boot devices for certain blades. Grayed-out blade entries indicate that the indicated blades are not currently installed in the system. The selection of boot devices and their order is processed as previously described for generating the blade boot list 25 using choice boxes. Clicking anywhere within any of the choice boxes shown in areas 32 causes a pull-down menu (for which an exploded view is shown on the right) which allows the user to select any of a series of secondary boot devices which apply to all the blades in the group 31. In operation, an underlying data structure 35 associated with each group is maintained in memory and reflects the choices made in the selection tab area 32 for each of the blades in the group 31. These underlying data structures are the previously mentioned Amanagement module boot lists@ 35. As stored in memory, each instance of a management module boot list 35 comprises a first memory area which lists the blade or blades belonging to the group, followed by five memory areas which list, in order, the boot devices selected for the group.

FIG. 8 specifically shows an example of a selection tab for specifying attributes associated with the blades belonging to group 1. In this example, blades 1, 3, and 4 are selected in area 31 as belonging to group 1. The boot devices which the management module will use for booting the blades belonging to group 1, and their order, as selected in area 32, are: USB DVD ROM 10, USB floppy 11, a USB memory key, and a network attached storage (NAS1).

FIG. 9 specifically shows an example of a selection tab for specifying attributes associated with the blades belonging to group 2. In this example, blades 2, 5, 8, and 9 are selected in area 31 while no devices are selected in area 32. This configuration specifies that the blades belonging to this group are not to be given further access to the boot devices which are definable and otherwise available through the management module. That is, for the blades belonging to this group, booting from management module MM1 through a management module boot list 35 is not permitted. Security is further enhanced by virtue of the administrator being able to exclude certain blades from booting through management module MM1.

FIG. 10 specifically shows an example of a selection tab for specifying attributes associated with the blades belonging to group 3. In this example, blades 11-14 are selected in area 31 as belonging to group 3. The boot devices to be used for this group are selected in area 32 as USB floppy 11 and USB DVD-ROM 10, in that order. Thus, in this example, blades 11-14 are allowed to boot only from devices which are locally accessible to management module MM1 through media tray MT.

Although several groups are shown, persons of ordinary skill in the art will be aware that a plurality of groups are not required to practice the invention and that an embodiment having only a single boot list for all blades in the system falls within the scope of the claims.

FIG. 11 is a logic flow diagram depicting the logic executed by processor 12 of management module MM1 in response to receiving a boot command from a blade specifying management module MM1 as the boot device. Significantly, the logic flow shown in FIG. 11 involves the traversal of one of several management module boot lists 35. Recall that the issuance of the boot command itself involves traversal by the blade through another boot list, the blade boot list 25 (described with reference to FIG. 7). Referring now to this figure, the boot command is received 42 by management module MM1 over the network as an INT 13 call from any of the 14 blades, as previously described. Upon receiving 42 the boot command, management module MM1 determines 44 the blade=s identity by inspecting channel parameters relating to the origin of the received data packet. This can be accomplished in several ways. However, in the preferred embodiment, the blade=s IP address is sniffed from the received packet, and, thereby, securely determining the blades identity by virtue of utilizing static IP addresses for each of the blades.

The blade=s identity can also be determined/verified by inspecting the originating channel itself, as in, for example, where exclusive hardware channels are utilize to provide management module access.

In one embodiment, the determination 44 can be made by inspecting the hardware characteristics of the channel through which the boot command was received. For example, where a hardware interface is used between each of the blades and the management module, the logical unit number of the virtual device can be examined to determine the originating blade responsible for the request.

In one embodiment, a trusted parameter identifying the blade can be passed as part of the boot command itself. Verification 44 can be through an encryption processor such as a trusted platform module (TPM) available to management module MM1.

Next, a determination 46 is made as to whether the identified blade is a member of a preestablished group. This is accomplished by examining each of the management module boot lists 35 for an entry indicating that the identified blade is a member of the group. In the case where all of the management module boot lists fail to show an entry for the identified blade, an authentication error code is returned 48 to the blade issuing the boot command and processing ends. Otherwise, when the identified blade is determined 44 to be a member of a group, and therefore meeting security criteria, a determination 50 is made as to whether the boot command includes any boot parameters. As previously described, boot parameters can be used to specify a subset of devices or even a specific device which is to be found within the appropriate management module boot list 35. Where it is determined 50 that boot parameters have been specified, a subset of the appropriate management module boot list 35 is traversed 54. The appropriate management module boot list is that management module boot list 35 which includes the identified blade as a member of the group (as per determination 46). This traversal 54 is to be described in further detail with reference to FIG. 13 and returns a device ID for a device on the list meeting the criteria given in the boot parameters and having available boot code. Where it is determined 50 that boot parameters have not been specified, the appropriate management module boot list 35 is traversed 52 without regard to certain boot parameters. This traversal 52 is to be described in further detail with reference to FIG. 12 and likewise returns a device ID for a device on the list having available boot code.

Depending on which branch of decision 50 the processing has taken, one of decisions 55 and 57 is then made as to whether the device ID returned from the corresponding one of traversals 52 and 54 is an ID for a device which is to be cached. Decisions 55 and 57 as to whether a specific device is to be cached depends upon available resources, whether a second blade has requested boot code which ultimately be provided by the same device, whether the number of blades belonging to a specific group exceeds a predetermined number, whether cached data already exists, whether the caching protocol maintained for any pre-existing cached data indicates that the data is stale, etc. If the corresponding one of decisions 55 and 57 is yes, the data is cached 56 according to well-known methods and delivered 58 to the identified blade; processing ends after the boot code is successfully delivered 58. Where the data is cached 56, the boot code is returned directly from management module MM1. This would typically be the case where the identified devices are accessible through the management module, such as USB DVD ROM 10 and USB floppy 11. However, caching 56 can also be performed indirectly as would be required for caching of a network attached storage device. Management module MM1 uses RAM (not shown) accessible to processor 12 for caching purposes. The cache, however, can also be implemented in a hard disk which, while not as fast as RAM, typically provides faster access than USB DVD ROM 10 or other devices including network attached storage.

Where the corresponding one of decisions 55 and 57 is no, the data is not cached and is delivered 58 to the identified blade; thereafter, processing ends. The boot code data can be delivered 58 directly from the identified device, thereby bypassing management module MM1, or, as previously described, can be routed through management module MM1.

Traversals 52 and 54 shall now be described in further detail.

Figure 12:
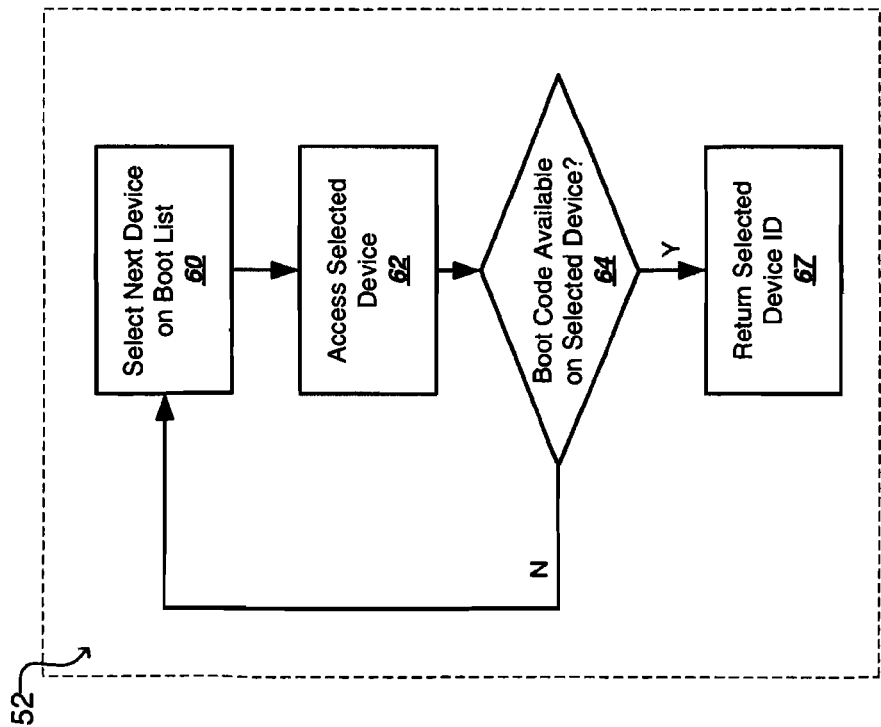
FIG. 12 is a logic flow diagram for traversing a management module boot list in search of boot code according to an embodiment of the present invention in the case where certain boot parameters are unspecified.

FIG. 12 is a logic flow diagram executed by processor 12 for traversing 52 a management module boot list in search of boot code in the case where certain boot parameters are unspecified. Upon original execution of traversal 52, the first device listed on the appropriate management module boot list 35 is selected 60; when selection 60 is iteratively called, the next device listed on the appropriate management module list 35 is selected 60. The currently selected device is then accessed 62 in search of bootable code. A determination 64 is then made as to whether boot code is available on the selected device. In this process, an actual attempt to access the boot code is made. Optionally, the boot code, once accessed, can be checked for validity by performing a check sum or other hash function such as MD5. If it is determined 64 that no code is available on the selected device or that the code on the selected device is invalid, processing continues by selecting 60 the next device as the next iteration. If it is determined 64 that boot code is available or available and valid, the device having available boot code is identified by returning 67 the selected device ID.

As part of selection 60, when traversal 52 is initially executed and an initial call is made to selection 60 or during iterative executions of selection 60, in the case where no boot devices are listed or no further boot devices available on the list, either because the list is null (as described with reference to FIG. 9), or because the end of the list has been reached with no successful outcome in the iterative loop, a null is returned (not shown).

Figure 13:
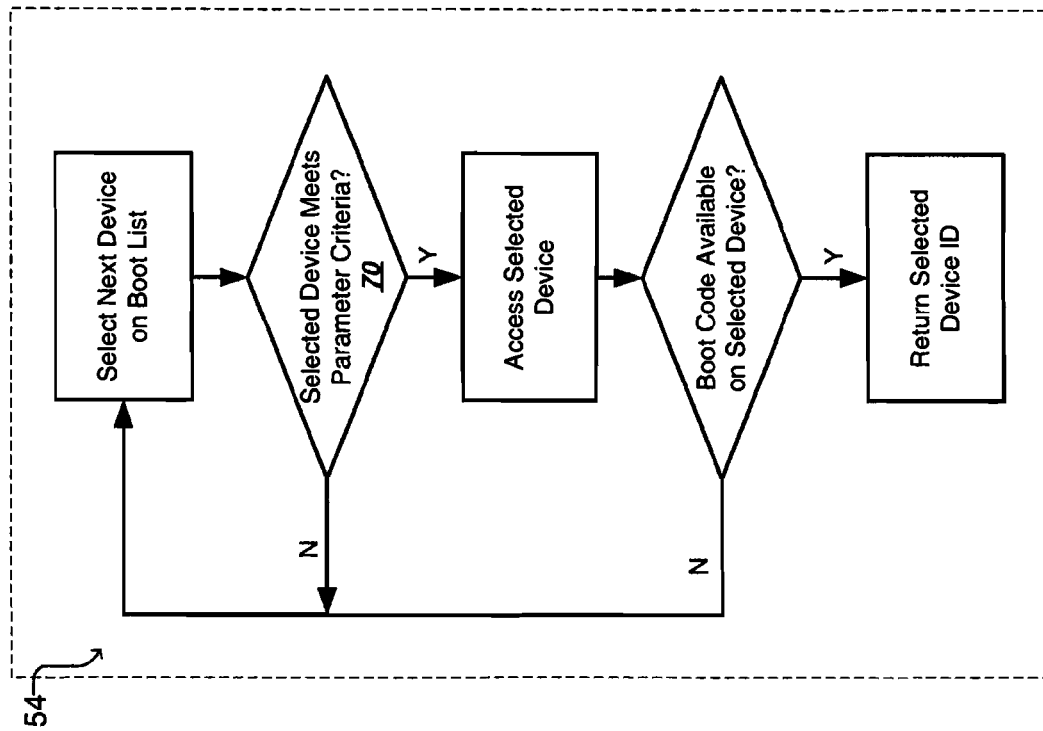
FIG. 13 is a logic flow diagram for traversing a management module boot list in search of boot code according to an embodiment of the present invention in the case where certain boot parameters are specified in a boot command.

FIG. 13 is a logic flow diagram executed by processor 12 for traversing 54 a management module boot list in search of boot code in the case where certain boot parameters are specified in a boot command. Traversal 54 is similar to traversal 52 in most respects. With traversal 54 of FIG. 13, an additional determination 70 is made as to whether the currently selected device meets certain parameter criteria passed in the boot command.

As previously described, a blade can provide a parameter indicating the USB generic device 22 or even a specific USB device such as USB DVD ROM 10.

Where the USB generic device 22 is specified as a parameter, the selected device must be a USB device. If it is determined 70 that the selected device is not a USB device it is bypassed and processing continues by iterating for the selection of the next device on the boot list. If it is determined 70 that the selected device is a USB device, processing continues by accessing the selected device and proceeding accordingly.

Where a specific USB device is specified as a parameter, the determination 70 similarly weeds out all other devices on the list which are not the specified device.

The arrangement described above optionally allows for a server-blade-system environment in which the boot devices for each of the blades are dynamically controlled by the administrator of the management module. This is accomplished by setting the first boot device on each blade boot list 25 to be the management module MM 21; this causes the blades to defer to the management module for boot purposes by default as the first bootable device. The management module boot lists 35 are then dynamically maintained and determine the boot resources for each of the blades.

Embodiments of the present invention include various functions, which have been described above. The functions may be performed by hardware components or may be embodied in machine-executable instructions as firmware or software, which may be used to cause a general-purpose or special-purpose processor programmed with the instructions to perform the functions. Alternatively, the functions may be performed by a combination of hardware, firmware and software.

An Embodiment of the present invention may be provided as a computer program product which may include a machine-readable medium having stored thereon instructions which may be used to program a computer (or other electronic devices) to perform a process according to any of the embodiments of the present invention. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic instructions. Moreover, an embodiment of the present invention may also be downloaded as a computer program product, wherein the program may be transferred from a remote computer to a requesting computer by way of data signals embodied in a carrier wave or other propagation medium via a communication link (e.g., a modem or network connection).

In the drawings and specifications there has been set forth a preferred embodiment of the invention and, although specific terms are used, the description thus given uses terminology in a generic and descriptive sense only and not for purposes of limitation.

What is claimed:

1. Apparatus comprising:
   a first computing device which traverses a first boot list specifying bootable devices from which bootable code is retrievable for execution; and
   a second computing device which is operatively accessible by said first computing device and which maintains a second boot list specifying bootable devices from which bootable code is retrievable for execution;
   wherein said first computing device is configurable to include a predetermined entry in the first boot list, and in response to traversing the first boot list and encountering the predetermined entry, said first computing device issues a command to said second computing device, and wherein the second boot list is traversed in response to the issued command in search of boot code which is to be executed on said first computing device;

wherein said second computing device returns the second boot list to the first computing device in response to the command; and said first computing device traverses the returned second boot list in search of the boot code; wherein if a listed device is directly accessible by said first computing device, said first computing device attempts to retrieve the boot code from the directly accessible device, and if boot code is encountered, executes the boot code, and if a listed device is indirectly accessible, said first computing device issues a second command identifying the indirectly accessible device to the second computing device, wherein, in response to the second command, the second computing device attempts to retrieve the boot code from the indirectly accessible device, and if encountered, routes the boot code to said first computing device for execution thereon.

2. Apparatus of claim 1, wherein said second computing device traverses the second boot list in response to the issued command, and in response to encountering accessible boot code at a device on the second list, said second computing device routes the boot code to said first computing device.

3. Apparatus comprising:

a chassis;

a blade which is removably mountable into said chassis and which traverses a first boot list specifying bootable devices from which bootable code is retrievable for execution;

a management module which is removably mountable into said chassis and operatively accessible by said blade and which maintains a second boot list specifying bootable devices from which bootable code is retrievable for execution; and a storage device which is accessible by said management module and which stores boot code therein;

wherein the second boot list is configurable to include said storage device, said blade is configurable to include a predetermined entry in the first boot list, and in response to traversing the first boot list and encountering the predetermined entry, said blade issues a boot command to said management module, wherein the predetermined entry identifies said management module as the bootable device; and said management module traverses the second boot list in response to the issued boot command, and in response to encountering said storage device as the bootable device, accesses the boot code stored in said storage device and delivers the boot code to said blade;

wherein the management module further caches the accessed boot code to a cache having an access time which is faster than the access time of said storage device and subsequently delivers the boot code from the cache.

4. Apparatus of claim 3, wherein the predetermined entry denotes the device type for said storage device and the device type is passed along with the boot command to said management module.

5. Apparatus of claim 4, wherein the denoted device type is a USB device type, and said management module traverses the second boot list in first to last order and limits boot code retrieval to USB devices on the second boot list.

6. Apparatus of claim 3, wherein the second boot list is maintained at said management module for a plurality of said blades wherein the second boot list is traversed in response to receiving the boot command from any of said blades.

7. Apparatus of claim 6, wherein a plurality of second boot lists are maintained at said management module wherein each of the plurality of second boot lists are used in association with one or more of said blades.

8. Apparatus of claim 3, wherein the boot command identifies said blade and wherein said management module authenticates said blade as a prerequisite to traversing the second boot list for boot code access.

9. A product comprising:

a nontransitory machine readable medium having computer readable program code stored therein, the computer readable program code in said product being effective to:

traverse a first boot list which specifies bootable devices from which bootable code is retrievable for execution, the first boot list being maintained at a first computing device;

maintain a second boot list specifying bootable devices from which bootable code is retrievable for execution, the second list being maintained at a second computing device;

wherein the first computing device is configurable for inclusion of a predetermined entry in the first boot list, and, in response to encountering the predetermined entry during said traversal of the first boot list by the first computing device, the code being further effective to: issue a boot command from the first computing device to the second computing device;

receive the boot command at the second computing device;

traverse the second boot list at the second computing device in response to said reception of the boot command; and access boot code stored in a storage device listed in the second list and sending the boot code to the first computing device wherein the second boot list is maintained at the second computing device for one or more of the first computing-device and a plurality of additional computing devices wherein the second boot list is traversed in response to receiving the boot command from any one or more of the first computing-device and the plurality of additional computing devices, wherein a plurality of second boot lists are maintained at the second computing device wherein each of the plurality of second boot lists are used in association with one or more of the first computing device and the additional computing devices.

10. The product of claim 9, wherein the predetermined entry identifies the second computing device as the bootable device and the second computing device further caches the accessed boot code to a cache having an access time which is faster than the access time of the storage device.

11. The product of claim 9, wherein the boot command identifies which computing device originated the boot command and wherein the second computing device authenticates the identified computing device as a prerequisite to traversing the second boot list for boot code access.

* * * * *